United States Patent [19]

Lang

[11] Patent Number: 5,620,622

[45] Date of Patent: Apr. 15, 1997

[54] DEVICE FOR DRYING AND STORING COOKING UTENSILS

[76] Inventor: Kang M. Lang, P.O. Box 82-144, Taipei, Taiwan

[21] Appl. No.: 489,229

[22] Filed: Jun. 12, 1995

[51] Int. Cl.⁶ .......................... F26B 19/00; F26B 25/06; F26B 25/12

[52] U.S. Cl. .............................. 219/385; 219/400; 34/202

[58] Field of Search .................................. 219/385, 386, 219/400; 392/379, 382; 34/90, 91, 202; 250/455.11

[56] References Cited

U.S. PATENT DOCUMENTS

| | | | |
|---|---|---|---|
| 2,411,365 | 11/1946 | Card | 34/202 |
| 3,683,638 | 8/1972 | Devon | 62/264 |
| 3,820,251 | 6/1974 | Abernathy | 34/202 |
| 4,091,548 | 5/1978 | Daily | 34/202 |
| 4,684,787 | 8/1987 | Bunting | 219/400 |
| 4,733,480 | 3/1988 | Hutchins | 34/202 |
| 4,877,963 | 10/1989 | Min-Jenn | 250/455.11 |
| 4,975,587 | 12/1990 | Min-Jenn | 250/455.11 |
| 5,502,900 | 4/1996 | Hui | 34/202 |

Primary Examiner—Teresa J. Walberg
Assistant Examiner—J. Pelham
Attorney, Agent, or Firm—Alfred Lei

[57] ABSTRACT

A device for drying and storing cooking utensils including a container open at a front side and having a top wall, two side walls, a rear wall, and a vertical wall mounted on the bottom of the container, the container having a recess at a bottom, the vertical wall being formed with a first opening communicated with the recess and a second opening provided with a filtering net, a water tray fitted in the recess through the first opening, a switch mounted on the lower wall, an inclined board mounted within the recess and having a slot at an end, an electric drier electrically connected with the switch and having an inlet and an outlet, the electric drier being installed under the inclined board with the inlet aligned with the second opening and the outlet aligned with the slot, a bottom plate mounted on a bottom of the container, a supporting plate mounted on an inner side of the rear wall, a cover pivotally connected with the vertical wall at a lower edge of the cover and having a flange extending towards the container, and a rack mounted on the flange.

1 Claim, 8 Drawing Sheets

DEVICE FOR DRYING AND STORING COOKING UTENSILS

BACKGROUND OF THE INVENTION

1. Field of the Invention

This invention relates to a drying device and in particular to one which can remove water from cooking utensils and keep them in safe and sanitary condition.

2. Description of the Prior Art

It has been found that the cooking utensils such as kitchen knifes 6 or the like inserted through a slot 82 of a holder 83 which is fixedly mounted on an inner side of a door 81 of a kitchen cabinet 8 (see FIG. 1). Nevertheless, such a holder 83 cannot be used to dry the cooking utensils and keep them from cockroach or the like thereby causing much inconvenience in use. Furthermore, the holder 83 cannot be used to keep a chopping board therein.

Therefore, it is an object of the present invention to provide a device for drying and storing cooking utensils which can obviate and mitigate the above-mentioned drawbacks.

SUMMARY OF THE INVENTION

This invention relates to a device for drying and storing cooking utensils.

It is the primary object of the present invention to provide a device for drying and storing cooking utensils which can keep the cooking utensils in sanitary and safe condition.

It is another object of the present invention to provide a device for drying and storing cooking utensils which is simple in construction.

It is still another object of the present invention to provide a device for drying and storing cooking utensils which is facile to manufacture.

It is still another object of the present invention to provide a device for drying and storing cooking utensils which is easy to maintain.

It is a further object of the present invention to provide a device for drying and storing cooking utensils which is convenient in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
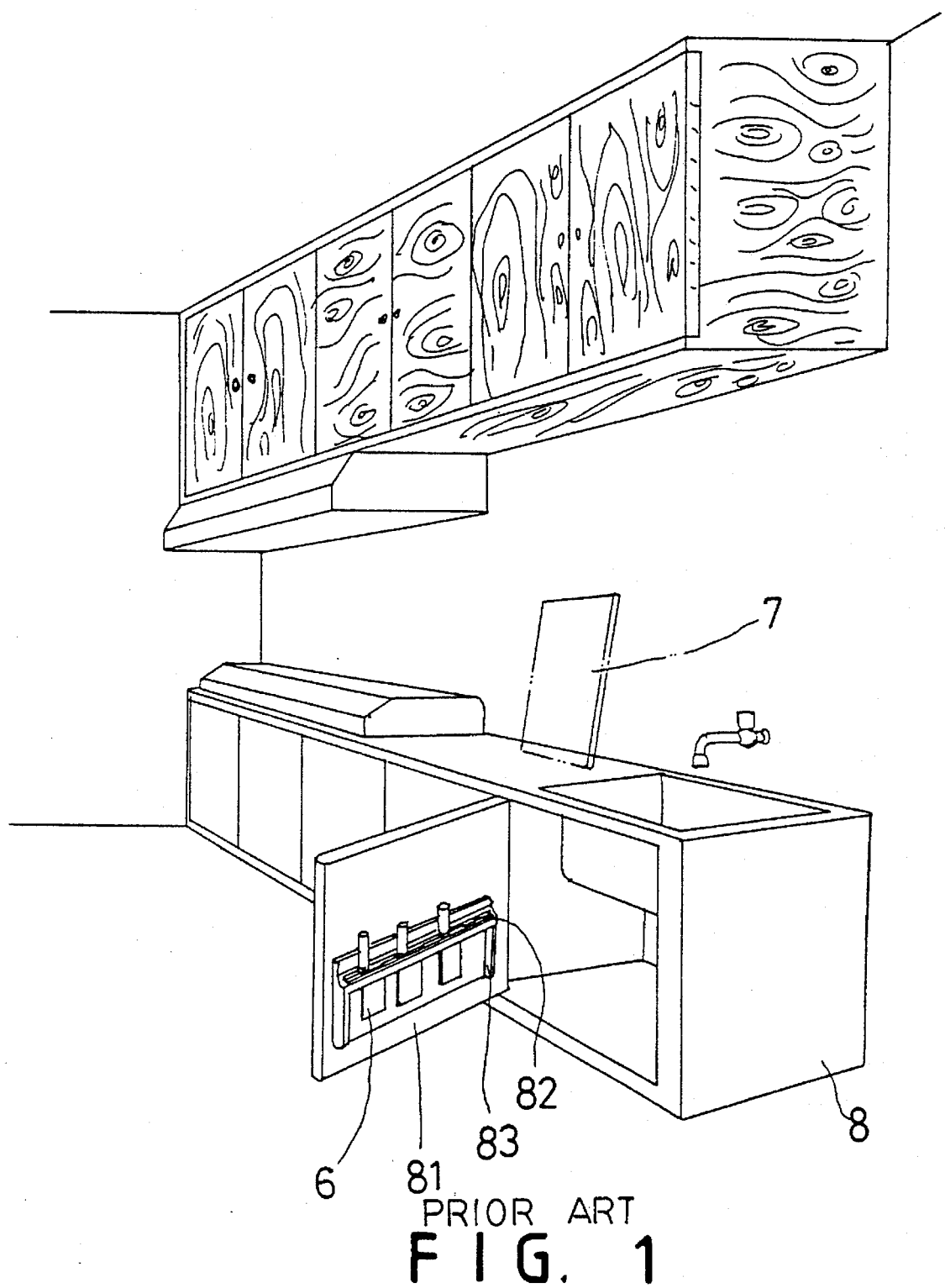
FIG. 1 is a perspective view of a prior art holder for cooking utensils.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
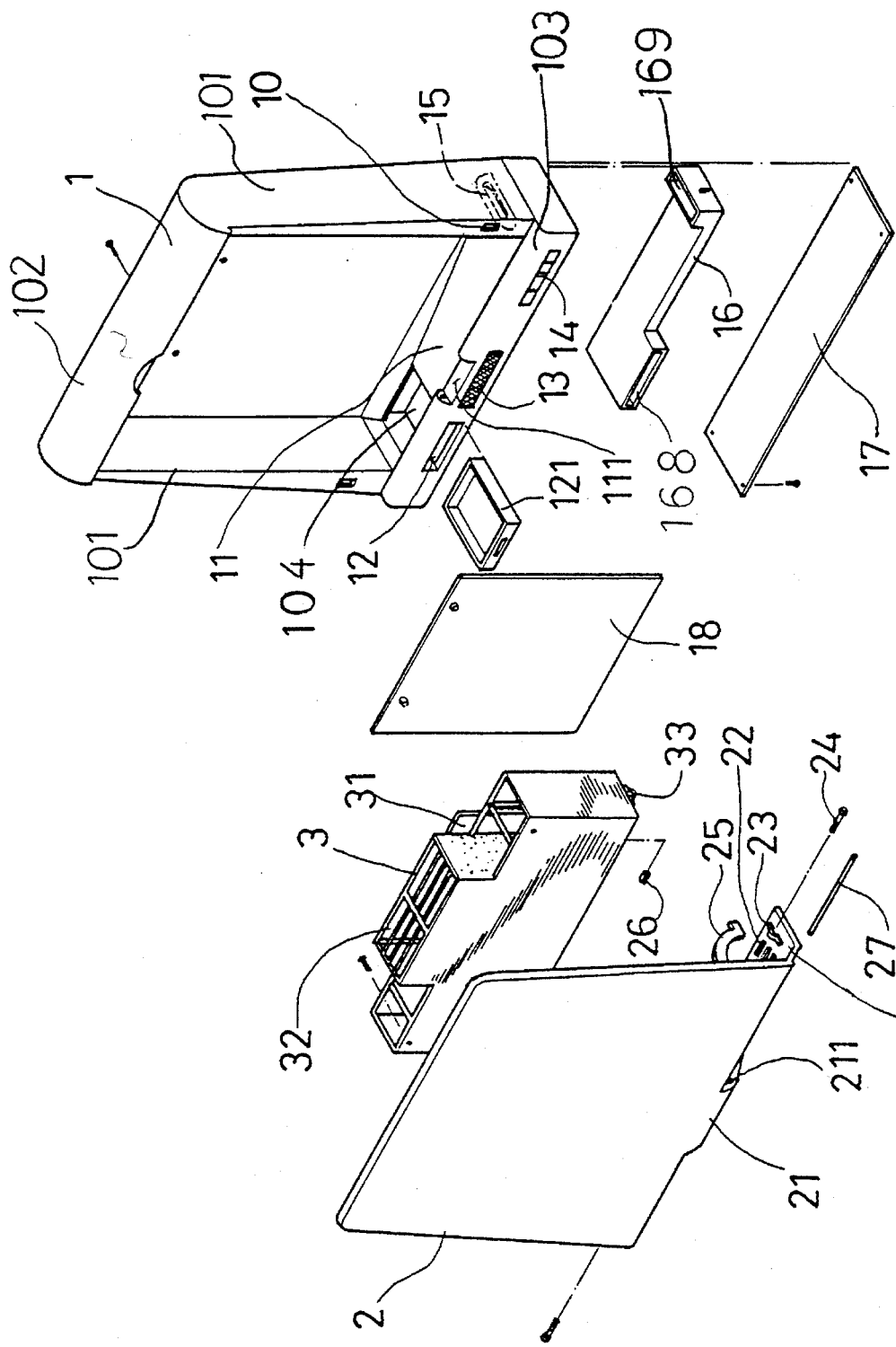
FIG. 2 is an exploded view of the present invention.
Figure 3:
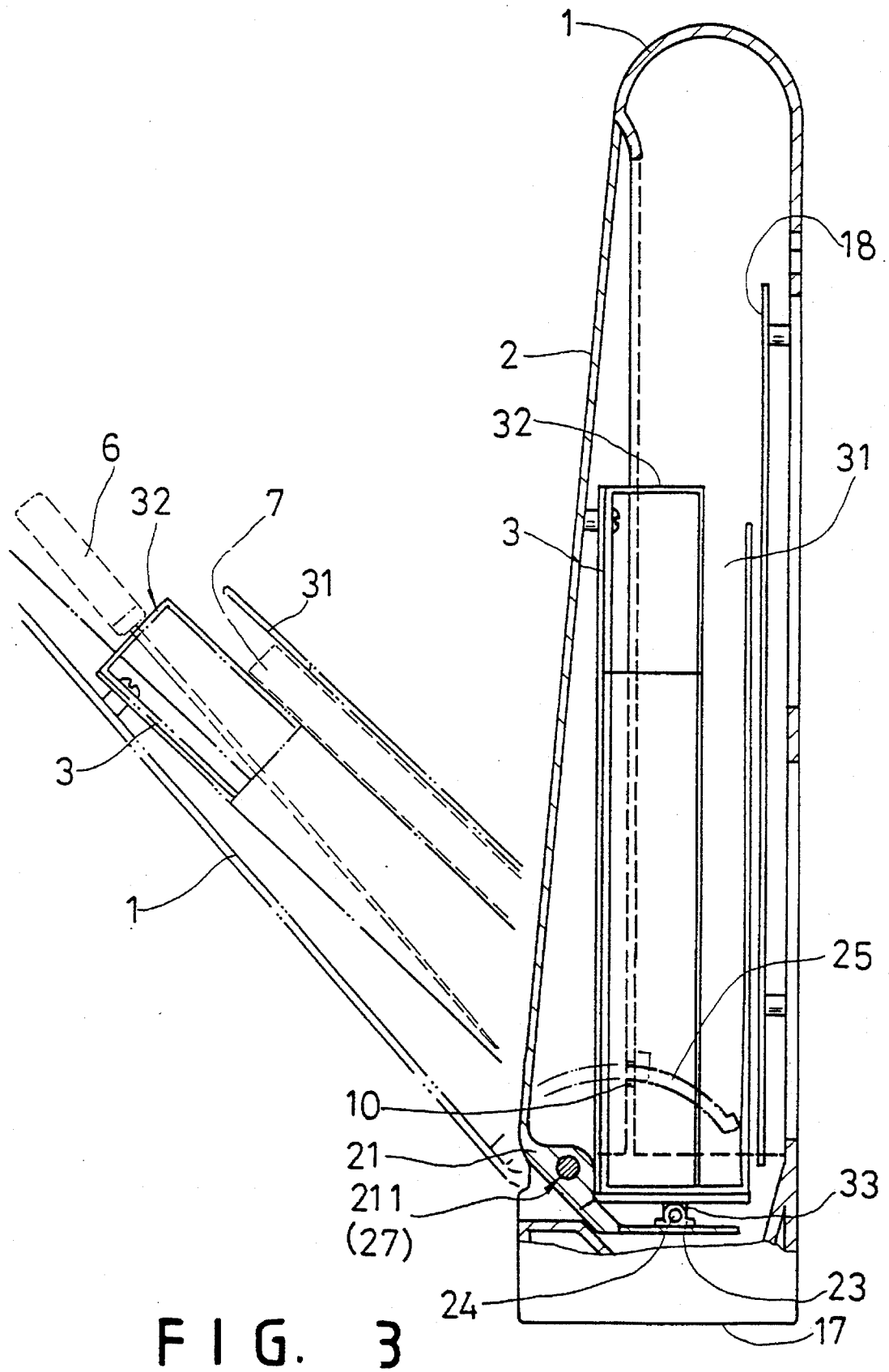
FIG. 3 is sectional view of the present invention shown in open position.

With reference to the drawings and in particular to FIGS. 2 and 3 thereof, the device for drying and storing cooking utensils according to the present invention comprises a container 1 which is a rectangular member open at the front side and has a top wall 102, two side walls 101, and a vertical wall 103 mounted on the bottom of the container 1. Each of the side walls 101 is formed with a hole 10. A recess 104 is formed at the bottom of the container 1. An inclined board 11 is fitted within the recess 104. The upper end of the inclined board 11 is formed with an opening 15. The vertical wall 103 has an opening 12 close to one end through which a water tray 121 is inserted into the recess 104. An opening 13 having a filtering net is formed at the intermediate portion of the vertical wall 103. A control switch 14 is provided close to the other end of the vertical wall 103. An electric drier 16 is installed under the inclined board 11 and has an inlet 168 aligned with the opening 13 of the vertical wall 103 and an outlet 169 aligned with the opening 15 of inclined board 11. The electric drier includes a heating element 163 and a motor 161 which is drivingly connected with an impeller 162 for blowing air through the heating element 163 (see FIG. 5). However, the electric drier 16 may be of any conventional design well to the those having ordinary skill in the art and is not considered a part of the invention. Further, the switch 14 is electrically connected to the electric drier 6 by any appropriate known means. A bottom plate 17 is secured on the bottom of the container 1 so as to keep the drier 16 in position. A supporting plate 18 is mounted on the inner side of the rear wall (shown but not numbered) of the container 1. A notch 111 is formed at the intermediate portion of upper side of the vertical wall 103 of the container 1. A cover 2, which has a neck portion 21 at the lower side adapted to engage with the notch 111 of the vertical wall 103 of the container 1, is pivotally connected with the vertical wall 103 of the container 1 by a pin 27 extending through a hole 211 of the neck portion 21 to go into two side walls of the notch 161. The cover 2 is provided at the inner side with two hooks 25 adapted to engage with the holes 10 of the side walls 101 of the container 1 so that the cover 2 can be open without disengaging from the container 1. The cover 2 is provided at the lower portion with a flange 105 having a plurality of slits 22 and lugs 23. A rack 3 having ears 33 at the bottom adapted to engage with the lugs 23 of the flange 105 of the cover 2 is mounted on the flange 105. The rack 3 is formed with a slot 31 for receiving a chopping board 7 (see FIG. 4) and a plurality of partitions 32 for accommodating a kitchen knife 6, a ladle, or the like.

Figure 4:
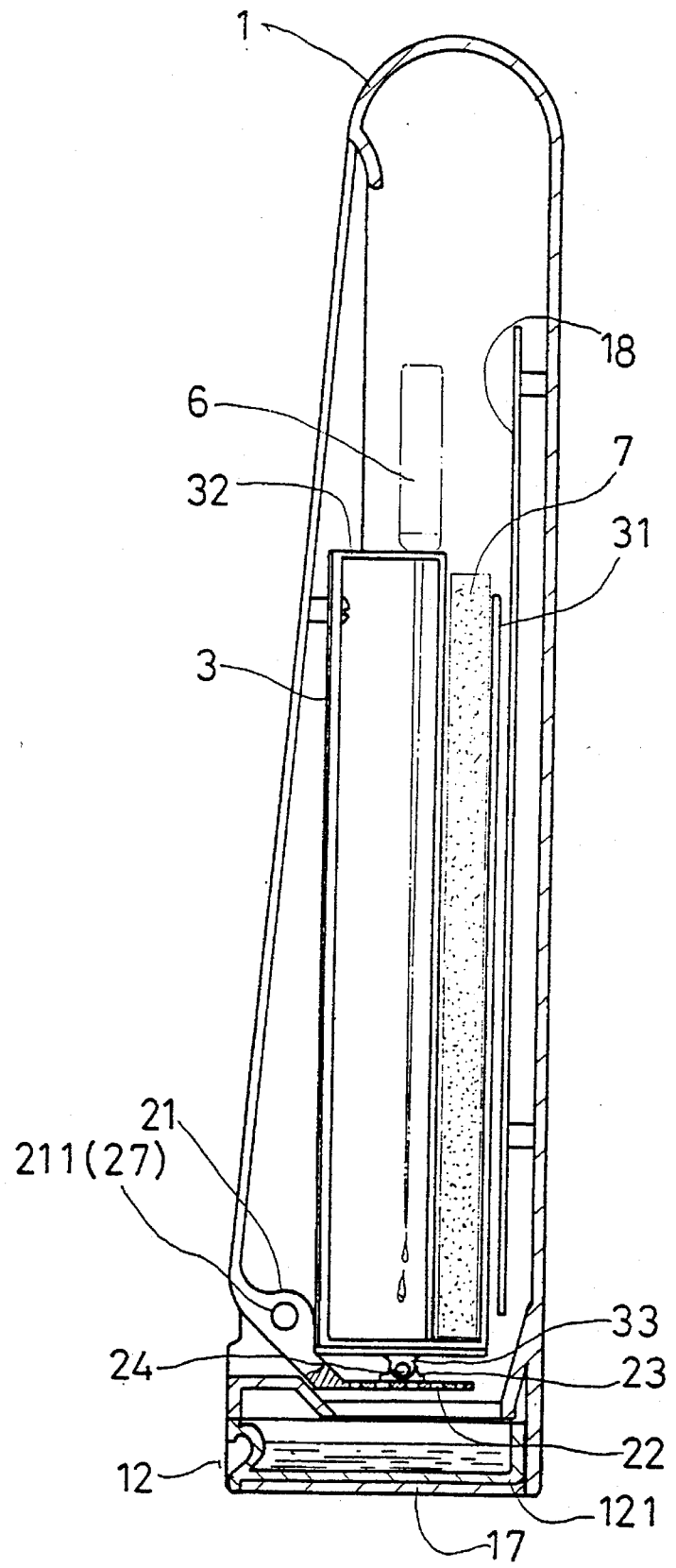
FIGS. 4 and 5 illustrates the working principles of the present invention.

Referring to FIG. 4, the water on the kitchen knife 6 will drip downwardly through the rack 3 on the inclined board 11 and then flow down into the water tray 121 from the inclined board 11.

Figure 5:
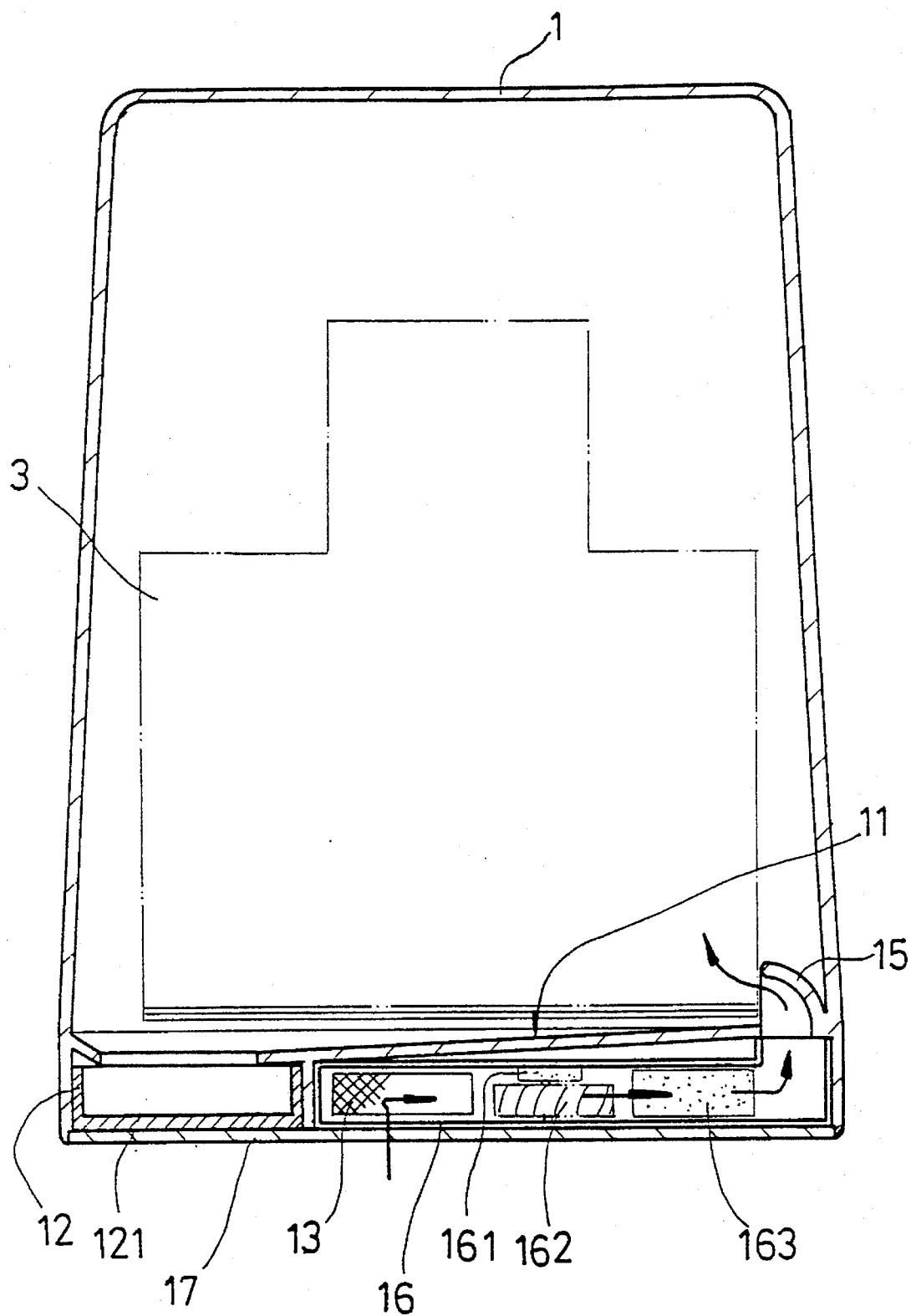

When desired to dry the cooking utensils in the container 1, it is only necessary to turn on the electric drier 16 thereby blowing hot air into the rail 3 (see FIG. 5).

Figure 6:
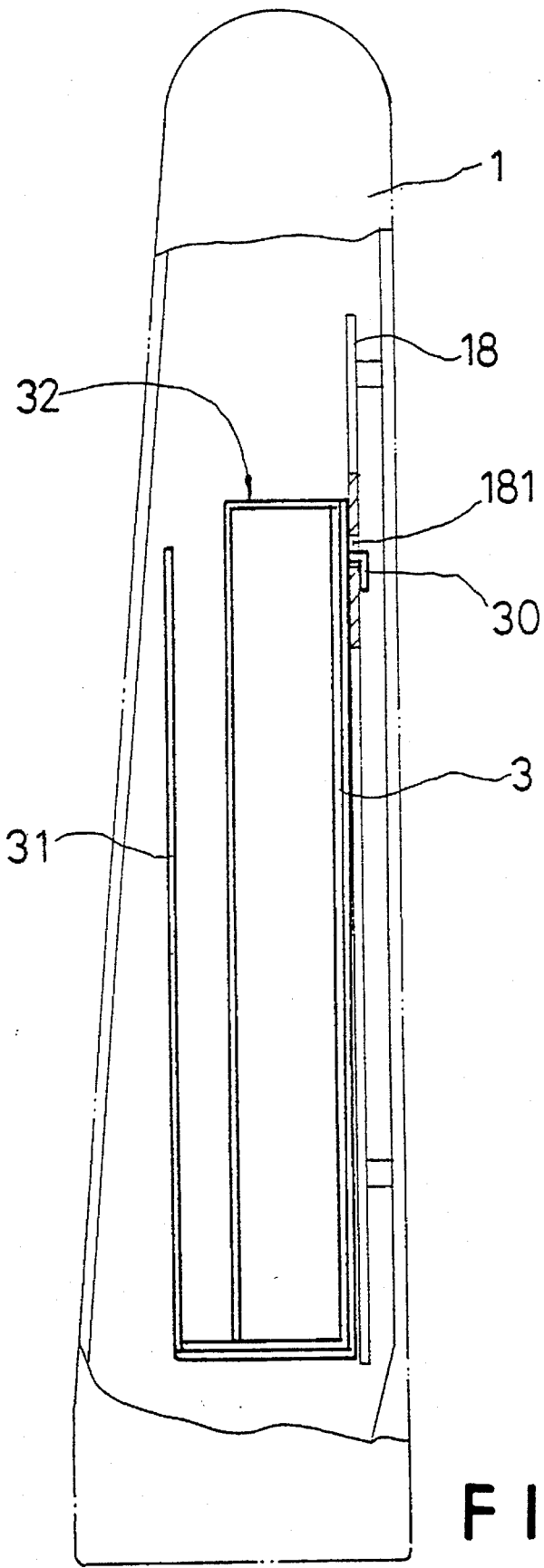
FIGS. 6 and 7 show a second preferred embodiment according to the present invention.
Figure 7:
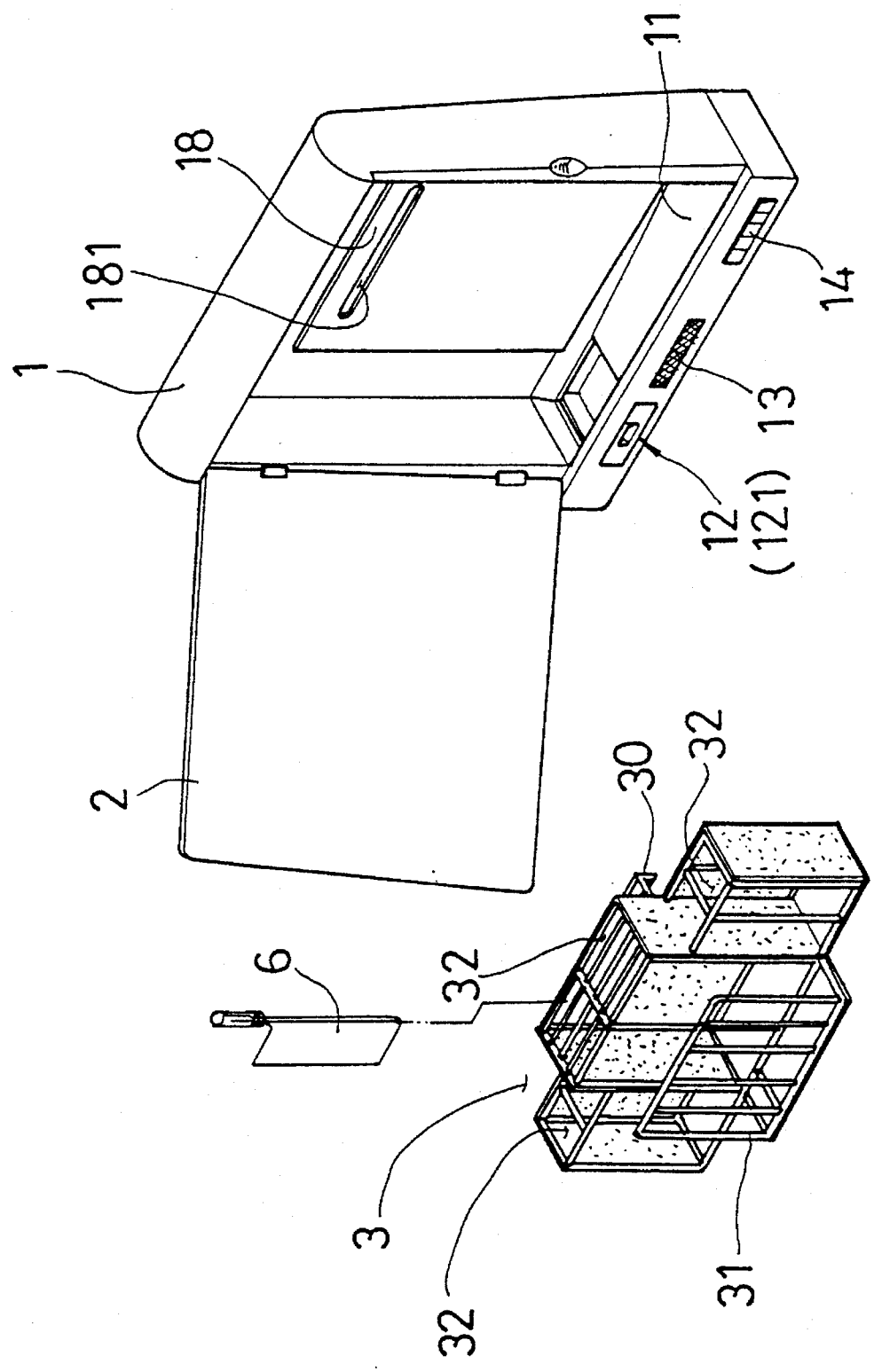

FIGS. 6 and 7 illustrate a second preferred embodiment of the present invention. As shown, the rack 3 is hanged on the supporting board 18, with its hook 30 engaged with the elongated slot 181 of the supporting board 18.

Figure 8:
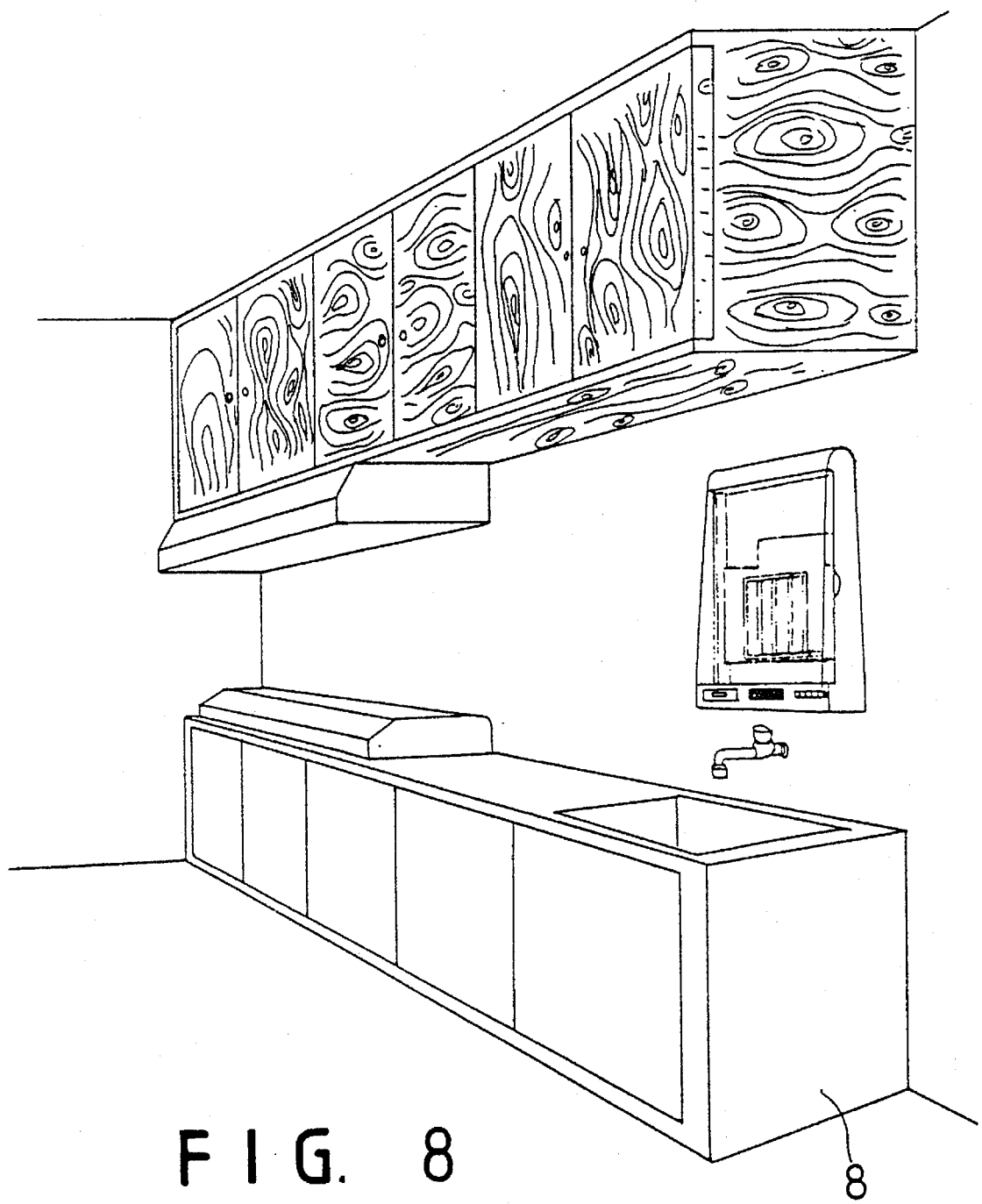
FIG. 8 is an applied view of the present invention.

FIG. 8 illustrates a working view of the present invention. As shown, the present invention is conveniently mounted on the wall above the kitchen cabinet 8.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A device for drying and storing cooking utensils comprising:

a container open at a front side and having a top wall, two side walls, a rear wall, and a vertical wall mounted on a bottom of said container, said container having a recess at the bottom, said vertical wall being formed with a first opening communicated with said recess and a second opening provided with a filtering net;

a water tray fitted in said recess through said first opening;

a switch mounted on said vertical wall;

an inclined board mounted within said recess and having a slot at an end;

an electric forced hot air drier electrically connected with said switch and having an inlet and an outlet, said electric forced hot air drier being installed under said inclined board with said inlet aligned with said second opening and said outlet aligned with said slot;

a bottom plate mounted on the bottom of said container;

a supporting plate mounted on an inner side of said rear wall;

a cover pivotally connected with said vertical wall at a lower edge of said cover and having a flange extending towards said container; and a rack mounted in said flange and having a hook adapted to hang on said supporting plate.

* * * * *